United States Patent

[11] 3,601,794

| [72] | Inventors | Robert W. Blomenkamp<br>Palo Alto, Calif.;<br>Enrique J. Klein, 947 Alice Lane, Menlo<br>Park, Calif. 94025 |
|---|---|---|
| [21] | Appl. No. | 763,673 |
| [22] | Filed | Sept. 30, 1968 |
| [45] | Patented | Aug. 24, 1971 |
| [73] | Assignee | said Klein, by said Blomenkamp |

[54] VEHICLE ACCELERATION AND DECELERATION SENSING AND INDICATING SYSTEM UTILIZING AN AC INPUT SIGNAL
9 Claims, 8 Drawing Figs.

[52] U.S. Cl. .................................................. 340/62,
324/70 A, 324/162, 340/262
[51] Int. Cl. .................................................. G01p 15/12
[50] Field of Search .......................................... 340/62,
262, 263, 271; 324/162, 70 A

[56] References Cited
UNITED STATES PATENTS
| 2,900,465 | 8/1959 | Weiss | 340/262 |
| 3,028,556 | 4/1962 | DuVall | 340/263 X |
| 3,069,623 | 12/1962 | Murgio | 324/70 A |
| 3,407,339 | 10/1968 | DeLong et al. | 340/263 |
| 3,455,148 | 7/1969 | Foster et al. | 340/262 |

Primary Examiner—John W. Caldwell
Assistant Examiner—Howard S. Cohen
Attorney—Enrique J. Klein ABSTRACT: Apparatus for the determination of acceleration, deceleration and reduction in acceleration of a vehicle in which an electromechanical sensing device generates an AC signal having a frequency which varies in accordance with the angular velocity of a shaft turning at a fixed ratio to the vehicle drive shaft. Electronic circuitry processes the signal of the sensing device for continuously monitoring of acceleration and deceleration on a meter, and for operating light signals indicating levels of acceleration, deceleration and reduction in acceleration in a system that is integrated with conventional vehicle light signals.

PATENTED AUG 24 1971

INVENTORS
E. J. KLEIN AND R. W. BLOMENKAMP

*J. Rosenblum*

ATTORNEY

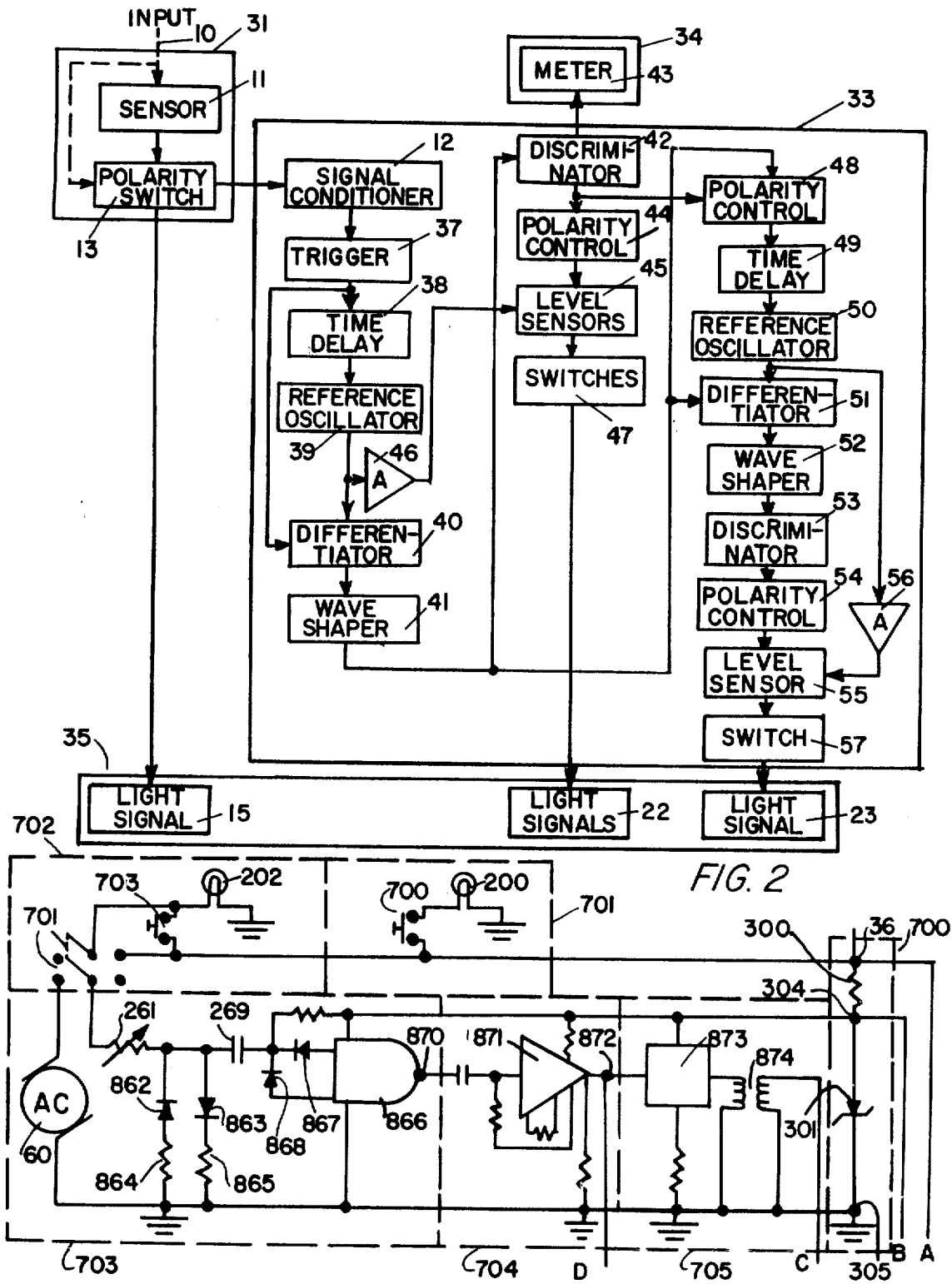

INVENTORS
E. J. KLEIN AND R. W. BLOMENKAMP

ATTORNEY

VEHICLE ACCELERATION AND DECELERATION SENSING AND INDICATING SYSTEM UTILIZING AN AC INPUT SIGNAL

The present invention relates to improvements in means for signalling from one motorized vehicle to its followers when it is accelerating or when it is decelerating, independently of the actuation of the accelerator or the use of the vehicle's brakes. It also includes means capable of signalling a reduction in acceleration to a following vehicle.

If one motorized vehicle follows closely behind the other in dense traffic, the driver of the following vehicle responds to perceived changes in the speed of the leading vehicle and attempts to keep the speed difference between his and the leading vehicle at a minimum so as to follow in a safe and stable manner. The following driver's response mechanism, which terminates in his actuation of the brake or the accelerator, will be set in action by his perception of external stimuli. Drivers will vary in experience and state of alertness and therefore, the obviousness of the external stimuli will determine whether it is perceived and also affect the reaction time. Normally, to appraise a change in velocity of the leading vehicle, a following driver must presently rely only on: (a) the range-finder capabilities of his eyes, and (b) stop lights, if the driver of the leading vehicle applies the brakes.

The deceleration of a vehicle when coasting is mainly due to the retarding effect of the internal combustion engine compression and to the aerodynamic drag of the body of the vehicle. The magnitude of this deceleration is higher for vehicles with powerful, high compression internal combustion engines, and for very light vehicles. Deceleration due to engine compression and aerodynamic drag is particularly high at the higher speeds where, for example, a value of −3 m.p.h./sec. at 70 m.p.h. is not uncommon. This indicates that in a short period of time a vehicle can decelerate significantly without giving any warning signal to the following driver, other than an increase in smoke from the exhaust when the accelerator pedal is released, which is not easy to detect and remains unobserved by many drivers.

Regarding a reduction in the acceleration of a vehicle, this describes a condition in which the magnitude of the acceleration becomes continuously smaller. This occurs, for example, while a vehicle that has been accelerating reaches a constant speed. A typical case in which this condition can represent a traffic safety hazard is that of two vehicles following each other closely while accelerating at approximately the same rate. As the leading vehicle decreases its acceleration towards a constant speed, no signal of such a change is given to the following driver, and if this driver does not decrease his acceleration correspondingly, the two vehicles will draw closer together possibly causing a rear end collision.

It is cleat that in the two cases of a vehicle's deceleration and of a vehicle's reduction in acceleration, if a signal were given to the following driver (independently of any use of the brakes in the case of deceleration), this driver would in many cases gain sufficient time to respond effectively and avoid an accident. The danger of such situations is magnified in fast traffic with closely following vehicles, as encountered in our modern freeways, or when driving on icy roads where the use of the vehicle's brakes may not be desirable.

Both of these traffic hazards have been recognized in the past. The danger of decelerating without giving a warning signal has been known at least for the last 20 years, and although a number of devices have since been proposed to provide the necessary sensing and signalling, none of them have gained widespread acceptance. One reason for the failure of the previous art is that systems based on the operation of the accelerator pedal are not practical because its position or motion does not give a true indication of the acceleration and deceleration of the vehicle. For example, a car with a weak engine may actually decelerate on a steep upgrade while the accelerator pedal is being depressed further, and the high frequency rate of its depress-release cycle under heavy traffic conditions would provide a confusing number of signals to a following driver. In the case of a decrease in acceleration, no means have been proposed until now, to provide the necessary sensing and signalling devices to combat this hazard.

An object of the present invention is to provide improved systems for sensing the acceleration, deceleration and reduction in acceleration of a vehicle on wheels.

Another object of this invention is to visually display the magnitude of acceleration or deceleration to the vehicle driver and to signal acceleration or deceleration and reduction in acceleration conditions to a following vehicle driver.

Another object of this invention is to provide fully automatic acceleration, deceleration and decrease in acceleration sensing and signalling systems which require no attention from the vehicle driver.

Yet another object of this invention is to provide a deceleration sensing and signalling system which in its simplest form can be adapted to existing vehicles without major modifications to the vehicle.

Specific systems for automatically sensing and indicating the acceleration, deceleration and reduction of acceleration of a vehicle are disclosed in our copending applications Docket Nos. KL–101 and KL–102, filed concurrently herewith, said systems being based on the processing of a DC signal of amplitude representative of the speed of the vehicle. The present application is particularly directed to such systems which are based on the processing of an AC signal of frequency representative of the speed of the vehicle.

The various features and advantages of the present invention will become more apparent upon consideration of the detailed descriptions given below. Preferred forms of the present invention are shown in the accompanying drawings wherein:

FIG. 2 is a block diagram of a complete sensing, AC signal processing and indicating system in accordance with the present invention;

Figure 1:
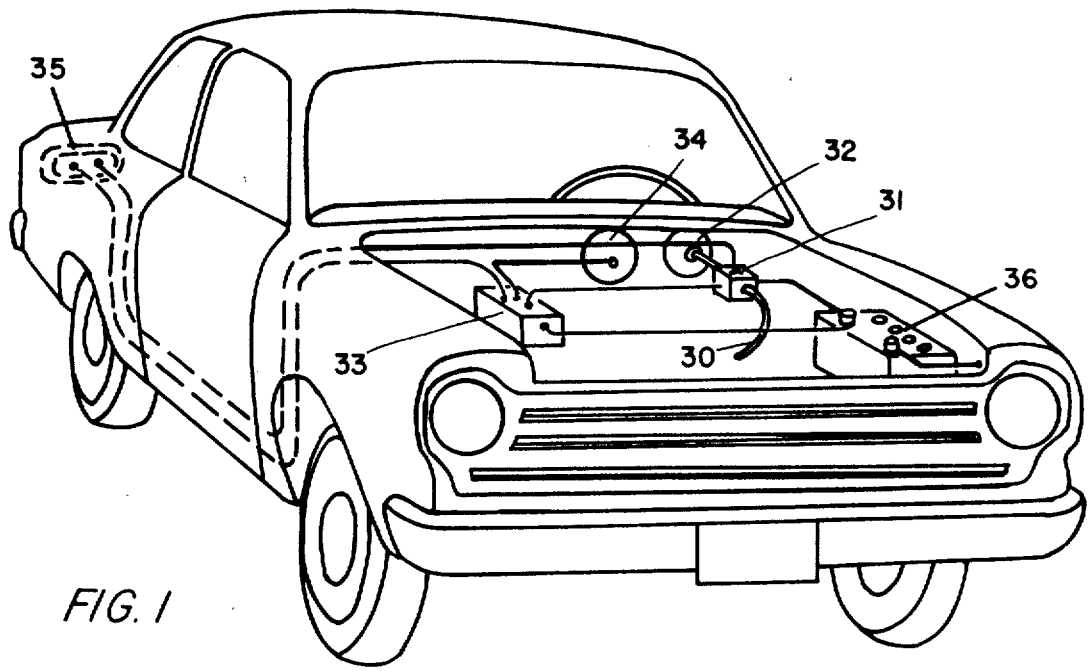
FIG. 1 is a perspective view of an automobile having the components of the sensing and signalling system of this invention installed therein.

Reference is now made to the drawings to FIG. 1 and FIG. 2 for the description of the principal parts of this invention and their functions. Reference is made later to the drawings of FIGS. 4 to 7 for detailed descriptions of the components of a preferred embodiment of this invention.

The automobile in FIG. 1 has its hood removed and shows schematically the principal components and component blocks of the present invention. The input signal is provided by the speedometer cable 30 which drives both a sensor inside an enclosure 31, as well as the automobile speedometer 32. Enclosure 31 is shown close to the speedometer 32 for convenience of illustration; a more suitable location would be at the speedometer cable takeoff at the transmission of the vehicle (see FIG. 3). The electrical signal from the sensor in enclosure 31 is then carried to enclosure 33 which contains electronic processing means. The electrical output of the circuitry in enclosure 33 consists of a signal corresponding to the acceleration or deceleration of the vehicle which is visually indicated by the meter 34, and of a signal corresponding to a reduction in acceleration. The electronic circuitry in enclosure 33 also operates switches at discrete levels of the acceleration, deceleration and reduction in acceleration of the vehicle, which then activate light signals incorporated in fixtures at the rear of the automobile like fixture 35.

A switching device sensitive to the forward or reverse motion of the automobile is also contained in the enclosure 31. This switching device activates the backup light signals of the vehicle also installed in the fixtures at the rear of the automobile, such as fixture 35. The DC power supply required for the operation of the electronic processing circuitry in enclosure 33, and for the light signals such as those in fixture 35, is provided by the automobile battery 36 and its generator.

In the block diagram of FIG. 2, the components of this invention are subdivided in terms of their functions and their interdependence is shown. The devices shown schematically in FIG. 1 are identified in FIG. 2 by rectangular blocks carrying the same numeration. Box 31 contains a sensor 11 and polarity switch 13; box 33 contains a signal conditioner 12, trigger 37, time delays 38 and 49, reference oscillators 39 and 50, amplifiers 46 and 56, differentiators 40 and 51, wave shapers 41 and 52, discriminators 42 and 53, polarity controls 44 and 48, level sensors 45 and 55 and switches 47 and 57. Fixture 35 incorporates light signal 15 activated from the polarity switch 13 in box 31 and light signals 22 and 23 activated from the signal processing circuitry in box 33.

The mechanical input 10, to the sensor box 31, is the rotation of the drive shaft to the wheels of the vehicle or the rotation of any other shaft turning at a fixed ratio to the drive shaft. Thus the change in angular velocity of this shaft will accurately reflect the acceleration and deceleration of the vehicle, except when the driving wheels are slipping or spinning on the ground. This mechanical input then drives the sensor 11 which produces an electrical signal which has an AC or pulse frequency directly related to the angular velocity of the mechanical input 10. The polarity switch 13 is governed by the mechanical input 10. It works like a double-pole double-throw switch disconnecting the electrical signal of the sensor 11 from the electronic signal processing circuitry and switching on the backup signal light 15 when input 10 corresponds to a reverse motion of the vehicle. On starting the forward motion of the vehicle the switch 13 connects the signal of the sensor 11 to the electronic signal processing circuitry and switches off the backup signal light 15.

The AC or pulse signal generated by the sensor 11 is electronically processed in the signal conditioner 12 which is essentially a clipper circuit, limiting the amplitude of the sensor signal. The output of the signal conditioner in block 12 drives a trigger circuit 37 which produces a wave of predetermined shape at a known multiple of the frequency of the input 10. The output of the trigger circuit 37 goes next through a time delay circuit 38 where the signal is electronically delayed by a known short period of time. The output from the time delay circuit is fed to a reference oscillator 39 which produces a signal of the same wave shape and frequency as the output signal from the trigger circuit. In the differentiator circuit in block 40, the delayed signal from the reference oscillator 39 is compared to an instantaneous signal from the trigger circuit 37, to a signal which varies in accordance with the frequency difference between the two input signals over the period of time introduced by the time delay circuit. Since the two input signals to the differentiator correspond to the angular velocity of input 10 at two closely spaced instants of time, the output signal becomes proportional to the first time derivative of that input. Therefore, as input 10 represents the angular velocity of a shaft corresponding to the velocity of the vehicle, a differentiated signal would correspond to the angular acceleration or deceleration of that shaft, or the acceleration or deceleration of the vehicle. The wave shaper circuit in block 41 corrects the shape of the output signal from the differentiator circuit 40 so that the discriminator circuit in block 42 will convert the output signal of block 41 to a DC signal corresponding to the first time derivative of the angular velocity of input 10. This signal is then directly monitored by the meter in block 43 which gives a continuous visual indication of the vehicle's acceleration or deceleration to the vehicle operator. The signal from the discriminator circuit 42 is next used as an input to circuitry controlling light signals to indicate one or more levels of acceleration and deceleration. The polarity control in block 44 causes signals corresponding to vehicle acceleration and signals corresponding to vehicle deceleration to be applied to separate groups of level sensing circuits in block 45. These in turn operate separate switches in block 47 which energize the light signals in block 22. The amplifier in block 46 provides sufficient gain to drive the level sensor circuits 45 and switches 47. When the acceleration or deceleration of the vehicle reaches a predetermined magnitude, the appropriate level sensor circuits and switches turn on the corresponding light signals in block 22 thus providing an indication of a given level of acceleration or deceleration.

The output of the wave shaper circuit in block 41, having a frequency which varies in accordance with the first time derivative of vehicle speed, is also used as an input to circuitry controlling a light signal indicating reduction in acceleration. The polarity control in block 48 only permits passage of signals increasing with time, corresponding to vehicle acceleration. A second differentiation of these signals would correspond to an increase or decrease of the vehicle acceleration. Another polarity control is therefore needed to restrict processing only to signals decreasing with time, corresponding to a decrease in vehicle acceleration. Signal processing from the time delay circuit in block 49 through to the light signal in block 23 is similar to that from the time delay circuit in block 38 through to the light signals in block 22, as described earlier, the main difference being that the polarity control circuit in block 54 restricts passage to signals corresponding to a reduction in acceleration. When the decrease in vehicle acceleration reaches a predetermined magnitude, the level sensor in block 55 actuates the switch in block 57 turning on the light signal in block 23 providing a visual indication to the following driver.

The principal parts of this invention have thus been described in connection with FIG. 1, and the functions of these parts have been described in connection with FIG. 2. A detailed description is given next of the components for a preferred embodiment of this invention.

Figure 3:
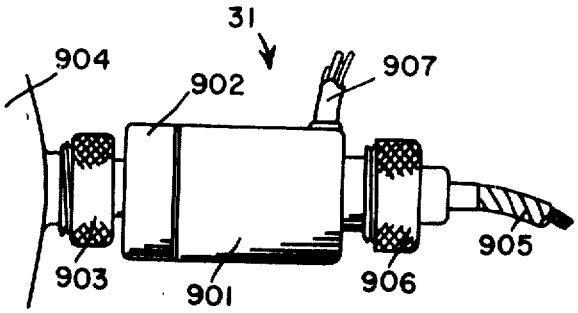
FIG. 3 is an elevational view of an electrical sensor and a mechanical switching device mounted to be driven by the transmission of the vehicle, for use in the system of FIG. 2.

In FIG. 3, the electrical sensor 901 corresponds to the sensor in block 11 of FIG. 2, and the mechanical switching device 902 corresponds to the polarity switch in block 13 of FIG. 2. Devices 901 and 902 can be fabricated to form one assembly which can then be attached at one end, by means of the nut 903, to the transmission housing 904 of the vehicle, while at the other end, the speedometer cable 905 can be attached to the assembly by means of nut 906. The electrical sensor 901 and the mechanical switching device 902 are preferably mounted on a common shaft which is then directly coupled to the speedometer cable takeoff at the transmission and to the speedometer cable itself. Electrical conductors corresponding to both the sensor and the switching device are represented by 907.

Figure 4:
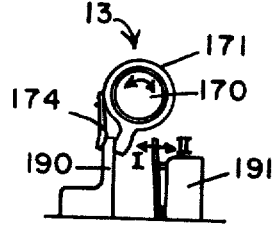
FIG. 4 is a transverse sectional view of a mechanical switching device, responsive to sense of rotation, for use in the system of FIG. 2.

A mechanical switching device responsive to sense of rotation, shown in FIG. 4, corresponds to the polarity switch in block 13 shown schematically in FIG. 2. This switch utilizes a frictional drag principle as disclosed and claimed in our copending application Docket No. KL-101, filed concurrently herewith. In FIG. 4, a shaft 170 turning at a fixed ratio to the drive shaft to the vehicle wheels has a slip ring arrangement 171 in which the shaft 170 can rotate freely. The slip ring 171 is restricted to a fixed position in the direction of the shaft axis. The slip ring 171 has a projection which can abut either against a fixed support 190 or the reed of a conventional, double-pole double-throw type microswitch 191. A spring 174 provides a biasing force to maintain the slip ring projection against the fixed support 190. When the shaft 170 rotates in the direction corresponding to the forward motion of the vehicle, i.e. clockwise in FIG. 4, the frictional drag between the shaft 170 and the slip ring 171 (transmitted by a viscous oil or grease) and the force exerted by the spring 174, both act to keep the projection of the slip ring 171 pressed against the fixed support 190 so that the reed of microswitch 191 remains in position 1. When the shaft does not rotate, the spring 174 alone maintains the slip ring projection against the fixed support 190 so that the reed of microswitch 191 is again in position 1. In position 1, microswitch 191 closes a contact carrying the output signal from a sensor 11 to signal processing circuitry as in box 33 in FIG. 2, and opens a contact to the backup lights of a vehicle such as the light signal 15 in FIG. 2. When the shaft rotates counterclockwise, Corresponding to a reverse motion of the vehicle, the frictional drag between the shaft 170 and the slip ring 171, overcomes the force of spring 174 and the slip ring projection pushes the reed of microswitch 191 into position 11. In position 11, microswitch 191 opens a contact carrying the output signal from the sensor to the signal processing circuitry, and closes the contact to the backup lights of the vehicle.

Figure 5:
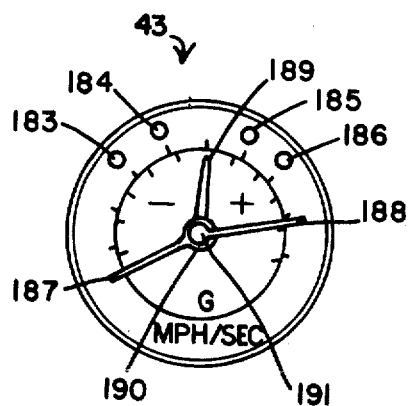
FIG. 5 is an elevational view of a meter which visually displays the magnitude of acceleration and deceleration of the vehicle, for use in the system of FIG. 2.

The meter of FIG. 5, for visually displaying the magnitude of acceleration and deceleration, corresponds to the meter in block 43 shown schematically in FIG. 2. The meter in FIG. 5 indicates acceleration and deceleration of a vehicle in forward motion both in terms of fractions of the acceleration due to gravity (G), and in miles per hour per second (m.p.h./sec.). The meter can be a zero center galvanometer or a biased microammeter. Four miniature lamps 183, 184, 185 and 186 are positioned on the meter scaleplate next to the magnitudes of acceleration and deceleration at which they are set to light up. The lamps 183 and 184 indicate two levels of deceleration and the lamps 185 and 186 indicate two levels of acceleration. Each lamp operates when the vehicle reaches the specified acceleration or deceleration and shows the same colors as the corresponding tail lights. Mechanical resetting pointers 187 and 188 are used to provide a record of both maximum deceleration and maximum acceleration. Pointers 187 and 188 are free to move except for a slight frictional drag which keeps them normally stationary. When the meter indicating needle 189 moves, it can push one of the pointers up to its maximum reading, where it remains when the needle 189 backs off. Pointers 187 and 188 can be reset or moved out of the way manually by two independent knobs 190 and 191.

Figure 6:
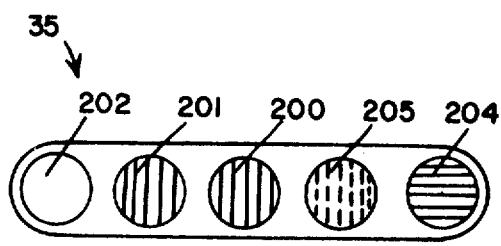
FIG. 6 is an elevational view of a composite tail light assembly for a vehicle, for use in the system of FIG. 2.

A composite tail light assembly shown in FIG. 6 corresponds to the fixture in box 35 shown schematically in FIG. 2. In FIG. 6, five light signals are mounted in one compartmental assembly. The light signal mount 200 comprises a red lens and a single filament lamp used as a conventional running tail light. The light signal mount 201 comprises preferably a red lens and a double filament lamp. The first filament is connected to a conventional brake actuated switch in parallel with a switch operating at a first threshold level of deceleration, and the second filament becomes energized at a second threshold level of deceleration, greater than the first. The light signal mount 202 comprises a colorless lens and a single filament lamp which is turned on when the vehicle goes into reverse motion. The light signal mount 204 comprises a preferably blue lens, and a double filament lamp in which each of the filaments becomes energized at a different threshold level of acceleration. The light signal mount 205 comprises a preferably violet lens and a single filament lamp which becomes energized at a given threshold level of decrease in acceleration.

Figure 7B:
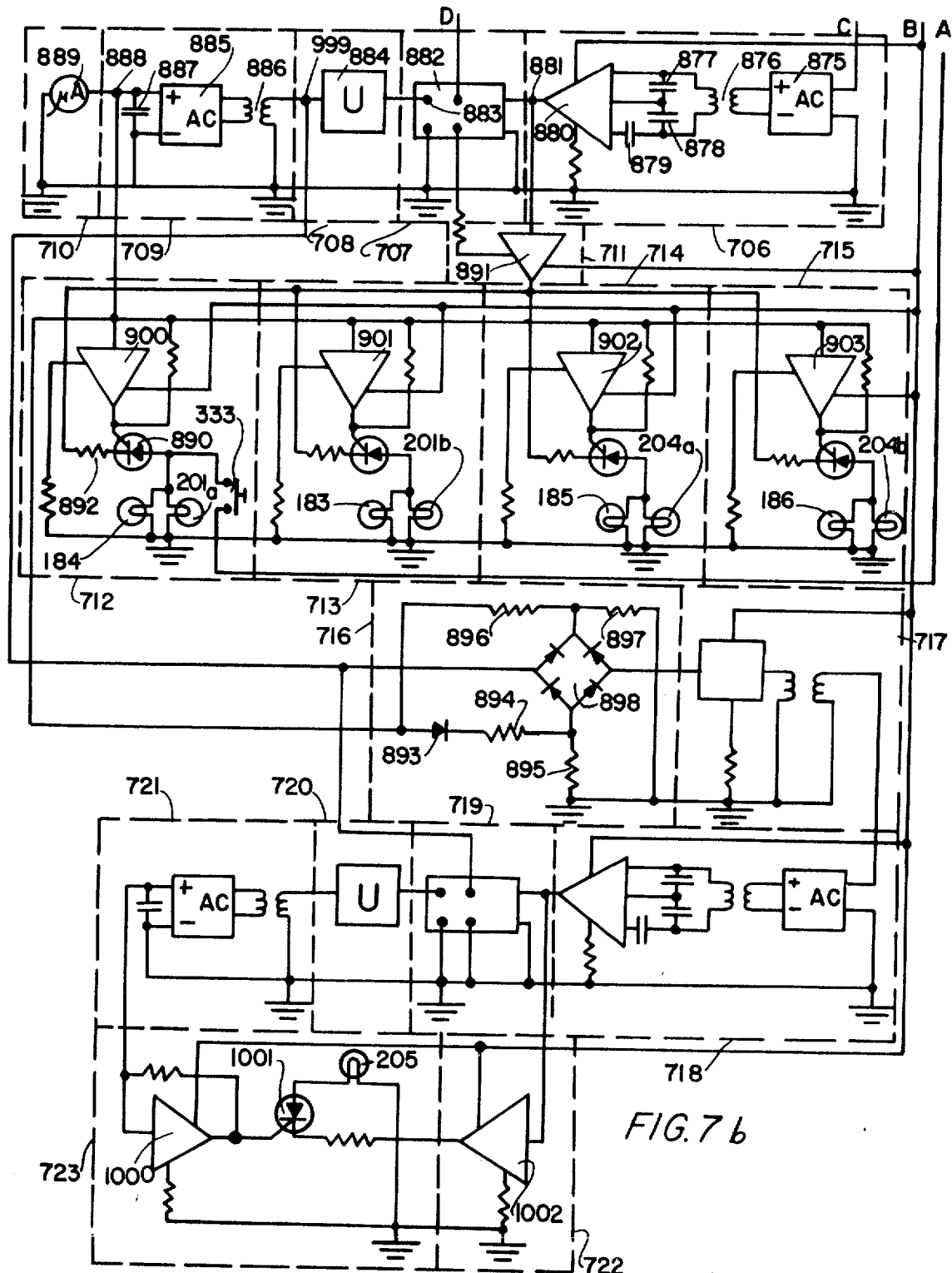
FIG. 7 ($a$ and $b$) is a schematic diagram of sensing, signal processing and indicating circuits, for use in the system of FIG. 2.

The schematic representation in FIGS. 7a and 7b is a preferred embodiment of a sensing, signal processing and indicating system of the present invention. The diagram is shown in two parts for convenience of illustration only. The four points of connection between FIG. 7a and FIG. 7b are labeled A, B, C and D in each figure. Circuitry and components enclosed by a broken line frame perform one or more functions corresponding to those of the more general block diagram FIG. 2. Each one of these blocks can be considered as an interchangeable module.

In FIG. 7, block 700 contains a resistor 300 and a zener diode 301 which provide a constant DC supply voltage $V_{cc}$ between terminals 304 and 305 for the rest of the electronics circuitry. The DC voltage E at terminal 36 can be supplied by a battery and either a DC power generator or an AC power generator followed by a full wave rectifier.

Block 701 comprises a switch 700 which controls the light signal of the conventional running tail light 200 of a vehicle, which is also shown in the compartmental assembly of FIG. 6.

Block 702 comprises a polarity switch 701, shown as a double-pole double-throw switch, responsive to the direction of motion of the vehicle. A preferred embodiment of switch 701 is described in connection with FIG. 4. Switch 701 controls passage of the signal from sensor 60 (see block 703) to the rest of the signal processing circuitry and controls the backup light signal 202. Block 702 also comprises a switch 703 which controls independently, the backup light 202 and is usually operated by the vehicle speed shift mechanism.

Block 703 comprises a small AC or pulse generator-sensor 60 driven by a shaft turning at a fixed ratio to the drive shaft to the vehicle wheels, such as the speedometer cable or the speedometer cable takeoff. Sensor 60 produces an electrical AC or pulse signal output of a known wave shape at a frequency which is approximately proportional to the angular velocity of the input shaft. The polarity switch 701, described in connection with block 702, insures that only signals corresponding to the forward motion of the vehicle are passed through to the rest of the circuitry. Block 703 also contains a signal conditioner circuit including a variable resistor 261 and an amplitude limiting circuit consisting of diodes 862 and 863 and resistors 864 and 865 which maintain the voltage signal within limit values. The signal conditioner in block 703 also comprises a multivibrator 866 in the form of an integrated circuit chip with two steering diodes 867 and 868 and a small coupling capacitor 869. The output at terminal 870 is a series of trigger pulses at half the input frequency.

The circuitry in block 704 represents a Schmitt trigger 871, also in the form of an integrated circuit chip. The output signal at terminal 872 is a square wave of the same frequency of the signal at terminal 870.

In block 706 the signal from terminal 872 is processed by a time delay circuit 873, in the form of an integrated circuit chip. The output of the time delay circuit 873 is applied to a pulse transformer 874, the signal of which in turn drives a reference oscillator in block 706 shown in FIG. 7b. In FIG. 7b, the reference oscillator shown is of the Colpitts type, consisting of a full wave rectifier 875 followed by a saturable transformer 876, the capacitors 877, 878 and 879 and an amplifier 880. The frequency of the output at terminal 881 becomes a function of the frequency of the input signal to the full wave rectifier 875.

The package 882 in block 707 represents a singly balanced mixer. This circuit determines the frequency difference between the output signal of the trigger at terminal 872 (in block 704 of FIG. 7a) and the delayed output signal from the reference oscillator at terminal 881 (in block 706). The frequency difference obtained at terminal 883 is then a measure of the change in the angular velocity of the input shaft to the sensor 60 in block 703 of FIG. 7a.

The wave shaper 884 in block 708, consists of a band pass filter with an isolated input and a balanced output. Its output drives a discriminator circuit 885 in the form of an integrated circuit chip, in block 709. The discriminator 885 consists of a ring demodulator, and is provided with an isolated input through the transformer 886 and with a filtered output through the capacitor 887. The DC signal at terminal 888 is then measured by the microammeter 889 in block 710. The meter reading will correspond to a first time derivative of the original input signal, that is, the angular acceleration or deceleration of the input shaft to the sensor, which corresponds to the acceleration or deceleration of the vehicle.

The circuit in blocks 712, 713, 714 and 715 are identical to each other except for the type of transistor amplifier used, the values of the biasing components, and the inclusion of a switch 333 in block 712 which does not appear in the other blocks.

Therefore a detailed description of the circuitry is only given for block 712. The circuit represents a composite polarity control, level sensor and switch for activating a light signal. Such a circuit performs the functions of blocks 44, 45 and 47 in FIG. 2. The signal from terminal 888 in block 710, is fed to a threshold amplifier 900 which is in the form of an integrated circuit chip. The amplifying element of the threshold amplifier 900 in block 712 is a current-amplifying NPN transistor which is biased to cutoff in the absence of a negative input voltage of magnitude exceeding a fist threshold level of deceleration; the amplifying element of the threshold amplifier 901 in block 713 is a current-amplifying NPN transistor which is biased to cutoff in the absence of a negative input voltage of magnitude exceeding a second threshold level of deceleration which is greater in magnitude than the first negative threshold level; the amplifying element of the threshold amplifier 902 in block 714 is a current-amplifying PNP transistor which is biased to cutoff in the absence of a positive input voltage of magnitude exceeding a first threshold level of acceleration; and the amplifying element of the threshold amplifier 903 in block 715 is a current-amplifying PNP transistor which is biased to cutoff in the absence of a positive input voltage of magnitude exceeding a second threshold level of acceleration which is greater in magnitude than the first positive threshold level. The output of the amplifier 900 is applied to the gate of the SCR (silicon controlled rectifier) 890 controlling the switching of lamps 201a and 184. When a threshold value of the signal current to the gate of the SCR 890 is reached and exceeded, the SCR 890 is turned on and current from the AC power amplifier 891 in block 711 passes through resistor 892 to the lamps. The amplifier 891 in block 711 supplies power to the circuits in blocks 713, 714 and 715 as well. This power amplifier can be replaced by an AC generator installed in the vehicle. Lamp 201a corresponds to the first filament of the double filament lamp in stop light 201 shown in the compartmental assembly of FIG. 6. Lamp 184 corresponds to a miniature lamp on the scaleplate of the meter shown in FIG. 5. These two lamps can also be independently controlled manually by a switch 333 usually operated by the vehicle brake mechanism. The input signal for the circuits of blocks 713, 714 and 715 is also that of terminal 888 (in block 710). The level sensing and switching circuit of block 712 controls the switching of lamps 201a and 184 are a given threshold value of a deceleration, while the circuit of block 713 controls the switching of lamps 201b and 183 at a second and higher threshold value of deceleration. Lamp 201b corresponds to the second filament of the double filament lamp in stop light 201 shown in FIG. 6. Lamp 183 corresponds to a miniature lamp on the scaleplate of the meter in FIG. 5. Similarly to blocks 712 and 713, the circuits in blocks 714 and 715 operate at a first and a second threshold level of the acceleration, respectively. The circuit of block 714 controls the switching of lamps 204a and 185, and that of block 715 controls the switching of lamps 204b and 186. Lamp 204a corresponds to the first filament and lamp 240b to the second filament of the double filament acceleration indicating lamp 204 in the compartmental assembly of FIG. 6. Lamps 185 and 186 correspond to miniature lamps on the scaleplate of the meter shown in FIG. 5.

Block 716 contains a polarity control circuitry consisting of a diode 893, two voltage dividers formed by resistors 894 and 895, and resistors 896 and 897 respectively, and the diode switch 898. When the input corresponding to the signal at terminal 888 in block 710 is positive, the diode 893 becomes forward biased and current flows through the voltage divider formed by the resistors 894 and 895. This allows a positive voltage with respect to the midpoint of the voltage divider formed by resistors 896 and 897 to be applied to the diode switch 898. The diode switch 898 is then turned on and the output signal of the wave shaper 884 in block 708 at terminal 999 can pass through the polarity control circuit in block 716. When the signal from terminal 888 is negative, diode 893 becomes backward biased, no current flows through it, the diode switch 898 remains off, and the signal from terminal 999 does not pass through the polarity control 716. Accordingly, only signals corresponding to an acceleration of the vehicle are processed by the circuitry of blocks 717 through 723.

Blocks 717, 718, 719, 720, 721, 722 and 723 in FIG. 7b comprise the same circuitry and operate in like manner to blocks 705, 706, 707, 708, 709, 711 and 712 respectively, in FIGS. 7a and 7b. The differences between these corresponding blocks is in the design values of the components.

The output of the discriminator circuit in block 721 will be the second time derivative of the original input speed signal, representing the increase or decrease in the acceleration of the input shaft to the sensor which, in turn, corresponds to the increase or decrease in the acceleration of the vehicle. The amplifying element of the threshold amplifier 1000 in the block 723 is a current-amplifying NPN transistor which is biased to cutoff in the absence of a negative input voltage of a magnitude exceeding a given threshold level, corresponding to a given threshold of decrease in acceleration. The output of the amplifier 1000 is applied to the gate of the SCR 1001, controlling the switching of lamp 205, which permits current from the AC power amplifier 1002, corresponding to block 56 in FIG. 2, to activate the signal lamp 205. Lamp 205 corresponds to the single filament lamp in signal light mount 205 shown in the compartmental assembly of FIG. 6. The miniature lamp 184 and the independently controlled switch 333 in block 712, FIG. 7b, have been removed from block 723 of FIG. 7b.

Having thus described all components and their functions in a preferred embodiment of this invention, a description will be given next of the operation of this device when installed in a vehicle.

Referring to the schematic diagram of FIGS. 7a and 7b, the device becomes fully operational when a voltage E is applied to terminal 36 in block 700. With the vehicle stationary, out of gear, and with no brakes applied, switch 701 in block 702 connects the sensor 60 in block 703 to the rest of the signal processing circuitry. However, since no signal is generated by the sensor 60, the indicating needle on the meter 889 in block 710 remains centered at zero, the indicating lights on the meter scaleplate remain off and no vehicle rear light signals are given. As the vehicle starts its forward motion, and accelerates, an AC or pulse signal is generated by the sensor 60. This signal is processed and a continuous indication of the vehicle acceleration is given by the needle of meter 889. If the acceleration reaches a predetermined first threshold value, the circuit in block 714 becomes operative and the acceleration indicating lamp 204a (first filament of a double filament lamp) of the vehicle and the corresponding miniature lamp 185 on the scaleplate of the meter 889 are switched on. If the acceleration is strong enough, the circuit in block 715 becomes operative as well and the acceleration indicating lamp 204b (second filament of a double filament lamp) at the rear of the vehicle and the responding miniature lamp 186 on the scaleplate of the meter 889 are switched on. As the vehicle reduces its acceleration towards a constant speed, the frequency increase of the signal generated by the sensor 60 is gradually reduced. As the signal frequency increase falls below the second and then the first threshold value, lamps 204b and 186, and then lamps 204a and 185 are switched off. If the reduction in acceleration of the vehicle is sufficiently large, the circuit in block 723 becomes operative and the decrease in acceleration indicating lamp 205 at the rear of the vehicle is switched on. Thus it is possible for the lamp indicating decrease in acceleration to be on simultaneously with one or both of the lamps indicating vehicle acceleration. As the reduction in acceleration of the vehicle becomes less pronounced, i.e. as the vehicle approaches a constant speed, lamp 205 is switched off.

As the vehicle travels forward at a constant speed, the frequency of the signal from sensor 60 also remains constant resulting in a zero acceleration reading on the meter 889. The circuits in blocks 712, 713, 714, 715 and 723 will not be activated and all indicating lamps in these blocks will remain off.

As the vehicle decelerates, starting from a constant forward speed, a continuous indication of the vehicle deceleration is given by the needle of meter 889. If the deceleration reaches a predetermined first threshold value, the circuit in block 712 becomes operative and the deceleration indicating lamp 201a (first filament of a double filament lamp) at the rear of the vehicle and the corresponding miniature lamp 184 on the scaleplate of meter 889 are switched on. If the deceleration is strong enough, the circuit in block 713 also becomes operative and the deceleration indicating lamp 201b (second filament of a double filament lamp) at the rear of the vehicle and the corresponding miniature lamp 183 on the scaleplate of the meter 889 are switched on. As the vehicle reduces its deceleration towards a constant speed, the frequency decrease of the signal generated by the sensor 60 is gradually reduced. As the signal frequency decrease falls below the second and then the first threshold value, lamps 201b and 183, and then lamps 201a and 184 are switched off.

When the vehicle moves in reverse starting from a stopped position, switch 701 in block 702 disconnects the sensor 60 in block 703 from the rest of the signal processing circuitry and turns on the backup light signal corresponding to the lamp 202 in block 702. When the vehicle stops after its reversing motion, switch 701 turns off lamp 202 and reconnects sensor 60 to the rest of the circuitry. Switch 333 (in block 712) operates manually by the vehicle brake mechanism, switch 703 (in block 702) operated manually by the speed control mechanism, and switch 700 (in block 701) operated by the vehicle lighting switch, can control the first level of deceleration light signal corresponding to lamps 201a and 184 (in block 712) the backup light signal corresponding to lamp 202 (in block 702), and the rear running light signal corresponding to lamp 200 (in block 701), respectively, quite independently from the automatic sensing and indicating system of the vehicle.

Having thus described in detail the components and the operation of a complete preferred embodiment of this invention, a simplified version of this embodiment, adapted to be installed in existing vehicles without major modifications to the vehicle, will be described.

Based on the complete schematic representation of FIGS. 7a and 7b, a simplified version would comprise blocks 700, 701, 702, 703, 704, 705, 706, 707, 708, 709, 711 and 712. The device would make use only of the conventional external light signals of a vehicle, that is, stop lights and backup lights. Its functions would be limited to (1) activating the rear stop lights of a vehicle at a given level of deceleration, independently from the operation of the vehicle brakes, and (2) activating the backup lights of the vehicle independently from the operation of the speed shift mechanism.

Components for alternative embodiments of the invention are disclosed next. Descriptions are given making reference to modules corresponding to some of the blocks shown in FIGS. 7a and 7b. Replacement modules for the AC generator-sensor in block 703 of FIG. 7a comprise (1) a magnetic rotor sensor, and (2) a light beam interrupting sensor.

The sensor itself can be driven by any of various ramifications of the drive shaft to the vehicle wheels. Typical installations would consist of (1) a sensor driven directly or through coupling elements by the speedometer cable or the transmission drive to it, and (2) a sensor driven through coupling elements by the drive shaft to the vehicle wheels.

Some typical replacement modules for the level sensor and switch of block 712, 713, 714, 715 and 723 in FIG. 7b, make use of (1) a transistor and one or two relays, (2) a power transistor, (3) a modified Schmitt trigger incorporating a power transistor, (4) a modified Schmitt trigger incorporating a relay, (5) a monostable multivibrator circuit, and (6) glass semiconductor threshold switches.

The circuits described in connection with the blocks of FIGS. 7a and 7b can be interchangeably used with any equivalent corresponding circuits performing the described functions, including combinations in which certain functions are eliminated.

Detailed descriptions of replacement modules having the above characteristics are given in our copending application Docket no. KL-101, filed concurrently herewith.

While only one preferred form of this invention has been disclosed, it is understood that this more detailed description is given by way of illustration and explanation only and not by way of limitation, since various changes therein may be made by those skilled in the art without departing from the scope and spirit of this invention.

Having thus described the invention, what is claimed is:

1. A system for automatically sensing and indicating at least one level of acceleration or deceleration of a vehicle, comprising: means for generating a first AC or pulse signal of a frequency which varies in accordance with the speed of said vehicle; first delay means for delaying said first signal by a first fixed period of time to obtain a second signal representative of said first signal but always delayed by said first fixed period of time; and first differentiator means for instantaneously comparing said second signal to said first signal on the basis of frequency for obtaining a third signal representative of the first derivative of the speed of said vehicle with respect to time.

2. A system according to claim 1, for additionally sensing and indicating a change in said first derivative of the speed of said vehicle with respect to time, wherein said third signal is an AC or pulse signal of a frequency which varies in accordance with the first time derivative of the speed of the vehicle, and further including: second delay means for delaying said third signal by a second fixed period of time to obtain a fourth signal representative of said third signal but always delayed by said second fixed period of time; and second differentiator means for instantaneously comparing said fourth signal to said third signal on the basis of frequency for obtaining a fifth signal representative of the second derivative of the speed of said vehicle with respect to time.

3. A system according to claim 1, including an indicator, and level sensing and switching means responsive to said third signal for activating said indicator when said first time derivative corresponds to a level of deceleration equal or greater in magnitude than a threshold level of deceleration.

4. A system according to claim 1, including discriminator means responsive to said third signal; first polarity control means responsive to said discriminator means; at least first and second indicators and at least first and second level sensing and switching means, said first level sensing and switching means actuating said first indicator when said third signal as modified by said discriminator means is of a given polarity representative of either acceleration or deceleration and exceeds a first threshold magnitude corresponding to a first threshold level of said acceleration or deceleration, and said second level sensing and switching means actuating said second indicator when said third modified signal is of said same given polarity and exceeds a second threshold magnitude, greater than said first threshold magnitude in absolute value, corresponding to a second threshold level of said acceleration or deceleration, respectively.

5. A system according to claim 2, including: second polarity control means responsive to said third signal for permitting said third signal to be applied to said second delay means and second differentiator means only when the frequency of said third signal increases with time, corresponding to acceleration of said vehicle; an indicator; third polarity control means; and level sensing and switching means for actuating said last-named indicator only when said fifth signal is negative and exceeds, in absolute value, a threshold magnitude corresponding to a threshold decrease in acceleration.

6. A system according to claim 5 wherein said second polarity control means comprises: a diode switch interposed between said first differentiator means, and said second delay means and second differentiator means; and diode means responsive to said third signal for turning on said diode switch when said third signal corresponds to an acceleration of said vehicle.

7. A system according to claim 4 wherein each of said level sensing and switching means includes a polarity sensitive threshold amplifier, and a silicon controlled rectifier (SCR), said SCR being interposed between an AC power source and the respective indicators which are actuated by turn-on signals from each of said level sensing and switching means, each of said turn-on signals being applied to the gates of the respective SCR's when the threshold level of acceleration or deceleration for each of said indicators is reached, to thereby permit said respective indicators to be energized by said AC power source through said respective SCR's.

8. A system according to claim 5 wherein said level sensing and switching means includes a threshold amplifier, and a silicon controlled rectifier (SCR) interposed between an AC power source and said indicator which is actuated by a turn-on signal from said level sensing and switching means, said turn-on signal being applied to the gate of said SCR when a threshold level of decrease in acceleration is reached, to thereby permit said indicator to be energized by said AC power source through said SCR.

9. A system according to claim 1, further including means responsive to said third signal for providing a visual indication corresponding to the magnitude of said third signal for the direct and continuous monitoring of the acceleration or deceleration of said vehicle.